US012583770B2

(12) United States Patent
Rudolf et al.

(10) Patent No.: US 12,583,770 B2
(45) Date of Patent: Mar. 24, 2026

(54) DEVICE FOR TREATMENT OF LIQUIDS AND THE METHOD OF TREATMENT OF LIQUIDS WITH USE OF THIS DEVICE

(71) Applicants: VYSOKE UCENI TECHNICKE V BRNE, Brno (CZ); MASARYKOVA UNIVERZITA, Brno (CZ); BOTANICKY USTAV AV CR V.V.I., Pruhonice (CZ)

(72) Inventors: Pavel Rudolf, Blansko (CZ); Frantisek Pochyly, Brno (CZ); Pavel Stahel, Brno (CZ); Jozef Rahel, Brno (CZ); Jan Cech, Brno (CZ); Blahoslav Marsalek, Brno (CZ)

(73) Assignee: VYSOKE UCENI TECHNICKE V BRNE, MASARYKOVA UNIVERZITA, BOTANICKY USTAV AV CR V. V.I. (CZ)

( * ) Notice: Subject to any disclaimer, the term of this patent is extended or adjusted under 35 U.S.C. 154(b) by 923 days.

(21) Appl. No.: 17/784,336

(22) PCT Filed: Dec. 7, 2020

(86) PCT No.: PCT/CZ2020/000054
§ 371 (c)(1),
(2) Date: Jun. 10, 2022

(87) PCT Pub. No.: WO2021/115498
PCT Pub. Date: Jun. 17, 2021

(65) Prior Publication Data
US 2023/0061133 A1 Mar. 2, 2023

(30) Foreign Application Priority Data
Dec. 13, 2019 (CZ) ................................ CZ2019-772

(51) Int. Cl.
*C02F 1/46* (2023.01)
*C02F 1/36* (2023.01)
(Continued)

(52) U.S. Cl.
CPC .............. *C02F 1/4608* (2013.01); *C02F 1/36* (2013.01); *C02F 1/48* (2013.01); *H05H 1/46* (2013.01);
(Continued)

(58) Field of Classification Search
CPC .. C02F 1/4608; C02F 1/36; C02F 1/48; C02F 2303/04; C02F 2305/023; C02F 2201/002;
(Continued)

(56) References Cited

U.S. PATENT DOCUMENTS

| | | |
|---|---|---|
| 2003/0146310 A1 | 8/2003 | Jackson |
| 2009/0071910 A1 | 3/2009 | Ike et al. |

FOREIGN PATENT DOCUMENTS

| | | |
|---|---|---|
| CZ | 303197 B6 | 5/2012 |
| CZ | 307098 B6 | 1/2018 |

(Continued)

OTHER PUBLICATIONS

Removal of Microcystis aeruginosa through the Combined Effect of Plasma Discharge and Hydrodynamic Cavitation; (Marsalek et al; Water 2020, 12, 8. https://doi.org/10.3390/w12010008) Dec. 18, 2019.
(Continued)

*Primary Examiner* — Xiuyu Tai
(74) *Attorney, Agent, or Firm* — Bryant Keller; Kirton McConkie

(57) ABSTRACT

The device for treatment of liquids by the help of generation of an electrically powered discharge of low-temperature plasma in liquid environment where is, when the liquid
(Continued)

flows, possible to achieve generation of cavitation or super-cavitation which consists of mutually in series connected a pressure regulator and a cavitation tube which is formed by two mutually connected inlet chamber, confusor, working chamber, diffusor and a discharge chamber, where the essence of the invention is that there is in the inlet chamber in its lengthwise axis in direction of liquid flow placed a powered electrode which by its free end reaches into the working chamber and to it is electrically conductive connected a high voltage source whereas the powered electrode is electrically insulated from the body of the cavitation tube and also is in the discharge chamber placed a grounding electrode which is in electric contact with the liquid. Further is the essence of the invention the method of treatment of liquids by the help of this device.

20 Claims, 5 Drawing Sheets

(51) Int. Cl.
C02F 1/48 (2023.01)
H05H 1/46 (2006.01)
H05H 1/48 (2006.01)

(52) U.S. Cl.
CPC ........... *H05H 1/48* (2013.01); *C02F 2303/04* (2013.01); *C02F 2305/023* (2013.01); *H05H 2245/36* (2021.05)

(58) Field of Classification Search
CPC ........ C02F 1/006; C02F 1/46104; C02F 1/34; C02F 2209/03; C02F 2201/003; C02F 1/32; C02F 1/78; C02F 2301/066; H05H 1/46; H05H 1/48; H05H 2245/36; H05H 1/247; H05H 1/4645; H05H 1/24; Y10S 422/906; F04D 7/02; B01J 19/08
See application file for complete search history.

(56) References Cited

FOREIGN PATENT DOCUMENTS

| | | | |
|---|---|---|---|
| CZ | 308532 B6 | 10/2020 | |
| EP | 2036864 A1 | 3/2009 | |
| EP | 3579666 A1 * | 12/2019 | ........... C02F 1/4608 |
| JP | 2014079743 A | 5/2014 | |
| WO | 2011021515 A1 | 2/2011 | |

OTHER PUBLICATIONS

Bruggeman, P.J., Kushner, M.J., Locke, B.R., et al., Plasma-liquid interactions: and review and roadmap, Plasma Sources Science and Technology, IOP Publishing, 2016, 25(5), 053002.

Lukeš, P., Doležalová, E., Sisrová, I. and Člupek, M., Aqueous-phase chemistry and bactericidal effects from an air discharge plasma in contact with water: evidence for the formation of peroxynitrite through a pseudo-second-order post-discharge reaction of H2O2 and HNO2, Plasma Sources Science and Technology, IOP Publishing, 2014, 13(1), 015019.

Stará, Z., Krčma, F., Nejezchleb, M. and Skalný, J.D., Organic dye decomposition by DC diaphragm discharge in water: Effect of solution properties on dye removal, Desalination, 2009, 239(1-3), 283-294.

Pawlat, J., Hensel, K. and Ihara, S., Generation of oxidants and removal of indigo blue by pulsed power in bubbling and foaming systems, Czechoslovak Journal of Physics, 2006, 56(Supplement 2), B1174-B1178.

Machala, Z., Tarabová, B., Sersenová, D., Janda, M. a Hensel, K., Chemical and antibacterial effects of plasma activated water: correlation with gaseous and aqueous reactive oxygen and nitrogen species, plasma sources and air flow conditions, Journal of Physics D: Applied Physics, 2018, 52(3), 034002.

Ihara, S., Hirohata, T., Kominato, Y., Yamabe, C., Ike, H., Hakiai, K., Hirabayashi, K. and Tamagawa, M., Water Treatment Using Discharge Generated in Cavitation Field with Micro Bubble Cloud, Electrical Engineering in Japan, Wiley Periodicals, 2014, 186(4), 1-10.

Oka, Y., Ohnishi, K., Asami, K., et al., Dispersion of carbon nanotubes into water without dispersant using cavitation bubble plasma, Vacuum, Elsevier, 2017, 136, 209-213[9].

Locke, B.R., Lukeš, P. and Brisset, J.-L., Elementary Chemical and Physical Phenomena in Electrical Discharge Plasma in Gas-Liquid Environments and in Liquids, Plasma Chemistry and Catalysis in Gases and Liquids, Wiley-VCH Verlag GmbH & Co., 2012, 185-241.

Ihara, S., Sakai, T., Yoshida, Y. and Nishiyama, H., Fundamental characteristics of discharge plasma generated in a water cavitation field, Journal of Electrostatics, Elsevier, 2018, 93, 110-117.

* cited by examiner

DEVICE FOR TREATMENT OF LIQUIDS AND THE METHOD OF TREATMENT OF LIQUIDS WITH USE OF THIS DEVICE

ART DOMAIN

The invention falls into the area of water modification, especially for purpose of liquidation of microorganisms and concerns design for treatment of liquids and the method of treatment of liquids with use of this device.

PRESENT PRIOR ART

The problematic of liquidation of microorganisms by use of cavitation with a specially shaped nozzle and an entry body which increases efficiency of cavitation is solved in the file CZ303197, where, however, is not considered influence of low temperature plasma. In device, which is here described, comes to cavitation due to decrease of pressure behind narrowed cross section with consequent generation of super cavitation followed with not so extensive area of water vapor.

Higher efficiency in liquidation of microorganisms is reached with use of plasma technologies. The principle is that in the area of super cavitation are inserted electrodes with high voltage. By all so far known designs are electrodes placed in the way that the electromagnetic field has perpendicular direction to direction of flowing liquid.

There known the whole range of technologies which are used for plasma treatment of liquids, possibly powder materials which are dispersed in liquid. These are mainly discharges working in atmospheric pressure. We can divide discharges into two groups either where the plasma is in direct contact with the liquid or not. As an example of discharges with direct contact of the liquid with the plasma is possible to mention for example jet discharges burning with regard to surface of the liquid or under its surface as is it described in the file CZ 307098, various surface discharges on the surface of liquid mentioned in the documents BRUGGEMAN, P. J., KUSHNER M. J., LOCKE, B. R., et al., Plasma-liquid interactions: and review and roadmap, *Plasma Sources Science and Technology*, IOP Publishing, 2016, 25(5), 053002 and LUKEŠ, P., DOLEŽALOVÁ, E., SISROVÁ, I. and ČLUPEK, M., Aqueous-phase chemistry and bactericidal effects from an air discharge plasma in contact with water: evidence for the formation of peroxynitrite through a pseudo-second-order post-discharge reaction of H2O2 and HNO2, *Plasma Sources Science and Technology*, IOP Publishing, 2014, 13(1), 015019, possibly diaphragm discharges which are described in the publication STARÁ, Z., KRČMA, F., NEJEZCHLEB, M. and SKALNÝ, J. D., Organic dye decomposition by DC diaphragm discharge in water: Effect of solution properties on dye removal, *Desalination,* 2009, 239(1-3), 283-294, furthermore discharges in bubbles generated by gas flow described in the document PAWŁAT, J., HENSEL, K. and IHARA, S., Generation of oxidants and removal of indigo blue by pulsed power in bubbling and foaming systems, *Czechoslovak Journal of Physics,* 2006, 56(Supplement 2), B1174-B1178, or by heat by electric current excited discharges described in the article LOCKE, B. R., LUKEŠ, P. and BRISSET, J.-L., Elementary Chemical and Physical Phenomena in Electrical Discharge Plasma in Gas-Liquid Environments and in Liquids, *Plasma Chemistry and Catalysis in Gases and Liquids,* Wiley-VCH Verlag GmbH & Co., 2012, 185-241. Into the second category, thus the group of discharges without direct contact with the liquid we can list discharges above the surface of the liquid possibly discharges in multiphase systems of liquids where the liquid is dispersed into aerosol or vapor and the discharge burns in this aerosol as it is described for example in the section MACHALA, Z., TARABOVÁ, B., SERSENOVÁ, D., JANDA, M. a HENSEL, K., Chemical and antibacterial effects of plasma activated water: correlation with gaseous and aqueous reactive oxygen and nitrogen species, plasma sources and air flow conditions, Journal of Physics D: Applied Physics, 2018, 52(3), 034002. One from disadvantages is then for example impossibility of treatment of the liquids which do not withstand higher temperatures.

Use of above mentioned induced discharges is quite significantly limited also by a small interactive area of plasma in comparison with capacity of by plasma treated liquid. Moreover some discharges, especially jet discharges need for their operation expensive gases as are for example argon or helium and it is in reality possible only in technologies where is necessary to treat small amount of liquids with high added value of plasma treatment therefore these types of discharges are not usable by applications where are main criteria costs.

Problem of ignition of discharge in liquids is necessity of an exceptionally high intensity of electric field, more than 1 MV/cm for excitation of avalanche ionization which leads to electric breakdown. Practically is therefore used trick with generation of gaseous micro bubbles in the area of discharge whereby critical value of electric field breakdown decreases under 10 kVk/cm. When used ohmic heating the amount of energy used only for evaporation of the liquid and formation of bubble makeup up to 95% of total input. Possible solution of this shortage is artificial pumping of gases in the form of micro bubbles into the liquid, namely either through a high voltage electrode or into the area of discharge space. Complication for ignition of the discharge this way is often high electric conductivity of the liquid which enables to reach break down intensity of the electric field only in capacity of only few bubbles. Consequently the resulting plasma is highly non-homogenous, filamentary and space restricted. This is solved through excitation of plasma in the form of HV pulse charging where the energy in, pulse is enormous and thus is possible to create discharge in the bubbles. However pulse discharge has quite high costs connected with high purchase price of charging high-voltage pulse sources and also next significant costs especially for modification of this technology for higher capacities.

Generation of plasma in liquids is followed with sonoluminiscence which appears during implosion of bubbles of vapors in liquids where are these bubbles generated by high-frequency waves without external application of electric field which leads to production of plasma bubbles in size in order 1 um and lifecycle around 100 ps.

Analogic type of bubbles is possible to generate also with a fast flow of liquid through a suitably shaped contraction when appears so called hydrodynamic cavitation. In the articles IHARA, S., HIROHATA, T., KOMINATO, V., YAMABE, C., IKE, H. HAKIAI, K., HIRABAYASHI, K. and TAMAGAWA, M., Water Treatment Using Discharge Generated in Cavitation Field with Micro Bubble Cloud, *Electrical Engineering Japan*, Wiley Periodicals, 2014, 186 (4), 1-10 and IHARA, S., SAKAI, T., YOSHIDA, Y. and NISHIYAMA, H. Fundamental characteristics of discharge plasma generated in a water cavitation field, *Journal of Electrostatics*, Elsevier, 2018, 93. 110-117 is described layout where the couple of HV electrodes is placed outside of shaped contraction whose electromagnetic field is perpendicular to direction of liquid flow in tube and in this way formed cavitation cloud they ignite intensive but space restricted plasma and herewith only comes to poor treatment of the liquid. The device which is described in the file US 2009/0071910 is always based on two electrodes (powered and grounding) which are present in the area of cavitation and furthermore it does not enable any inlet of gasses or solid powder into the area of plasma, discharge, in the publication OKA, Y., OHNISHI, K., ASAMI, K., et al, Dispersion of carbon nanotubes into water without dispersant using cavitation bubble plasma, *Vacuum*, Elsevier, 2017, 136, 209-213[9] is mentioned design where was for formation of cavitation cloud used rotating cylinder with revolutions 7200 rev/min., also here were both powered electrodes placed directly in the cavitation cloud and resulting plasma was also strongly non-homogenous.

An extreme example of formation of bubbles in liquids is then formation of foam which is a thermodynamically unstable colloid structure with high concentration of dispersed gas. This is therefore a two-phase system where the water is present in the form of a thin membrane which is separated by gas bubbles. The foam can be generated by whipping, gas pumping, shaking or vacuuming. All depends on characteristic of the liquid, temperature, pressure, presence of various surfactants and so on, in such foamy environment is possible to simply ignite the discharge and treatment of the liquid is highly effective up to 10× better than in above mentioned discharges. Disadvantage is then the necessity to supply big amount of gas, energy demandingness of foam production especially when characteristic of the liquid prevent generation of foam and furthermore not big suitability of usage in higher quantities.

The aim of the invention is to eliminate above described disadvantages of known designs and create such method of plasma treatment of liquids and a device for generation of low-temperature plasma in liquids which would be universally suitable for industrial plasma treatment of various types of liquids with wide variety of characteristic and conductibility including liquids with dispersed powders which would not need for right function high volume of working gas, would be energetically, spatially and investment modest, would generate plasma in the whole cross section of supplied liquid and would enable simple dimensioning and scaling up for various flows.

ESSENCE OF THE INVENTION

The desired goal is reached with a new invention which is a device for treatment liquids by the help of generation of an electrically powered discharge of low-temperature plasma in liquid environment, in which, when the liquid is flowing, is possible to reach generation of cavitation or super-cavitation, which consists of mutually in series connected a pressure regulator and a cavitation tube which is formed by mutually to each other connected an inlet chamber, confusor, working chamber, diffusor and a discharge chamber, where is not only in the inlet chamber, in its lengthwise axis in direction of flow of the liquid, placed a powered electrode, which by its free end reaches into the working chamber and to which is electrically conductive way connected a high voltage source, whereas the powered electrode is electrically insulated from the body of the cavitation tube and there is also in the discharge chamber placed a grounding electrode which is in electric contact with the liquid.

In an advantageous design is the powered electrode fixed on an electrode support which is placed inside of the inlet chamber perpendicularly to the lengthwise axis of the cavitation tube from which is electrically insulated, whereas the powered electrode is with the electrode support electrically connected and to the electrode support is connected a high-voltage source.

In another advantageous design are then the electrode support and the powered electrode made hollow with a formed common transit inner cavity which is on one side open outside of the cavitation tube and on the other side on free end of the powered electrode reaching into the working chamber.

Likewise it is advantageous when the rounding electrode is made as a part of shell of the discharge chamber.

In another advantageous design is the grounding electrode made as an ultrasound powered tip which is connected to an ultrasound generator.

And finally it is advantageous when either behind the discharge chamber is placed an ejector which is formed by a supply chamber connected to the discharge chamber of the cavitation tube and a throat where from the supply chamber is led a suction pipeline which is opened into the throat or there is behind the discharge chamber to the cavitation tube connected a pump.

The essence of the invention is also the method of treatment of liquids by the help of the device according to the claims 1 to 7 whose essence is that there is low-temperature plasma generated into place of formation of cavitation or super-cavitation or to close vicinity of its formation against the flow of the liquid namely in direction of its flow by the help of an powered electrode which is placed in line with flow of the liquid whereas the size of frequency of the high voltage discharge ranges between values 0 to 20 MHz.

In preferable design is the plasma ultrasound stimulated.

In another advantageous design is into the place of formation of cavitation or super-cavitation supplied gas or solid substance in the form of powder.

Likewise is preferred when the powder solid substance is photo reactive.

In another advantageous design is the liquid sucked out behind the place of disappearance of cavitation.

With presented invention is reached higher efficiency because when is used a full powered electrode the discharge is electrically excited in diluted vapors of the liquid without access of air which is advantageous for flammable liquids and dispersions. Also the plasma burns in super-cavitation from the powered electrode to capacity of the liquid and for different conductivities of the liquid is not necessary to optimize distance of the electrodes. Conductivity of the liquid has influence only on length of the zone with powered plasma namely at keeping of constant performance thus it is not necessary to optimize distance of the electrodes for given medium with various parameters. In case of use of a hollow powered electrode is possible to suck into the flowing liquid gas, reaction liquid or particles in form of powder which are then dispersed into the working liquid and consequently treated by formed plasma in super-cavitation. In case of use of even hollow grounding electrode is possible to treat also solid non-conductive materials in form of fibers or rods.

CLARIFICATION OF DRAWINGS

Particular examples of invention design are schematically illustrated in enclosed drawings where:

The drawings which illustrate presented invention and consequently described examples of particular design do not in any case anyhow limit the extent of the protection mentioned in the definition yet solely clarify the essence of the invention.

EXAMPLES OF INVENTION DESIGN

Figure 1:
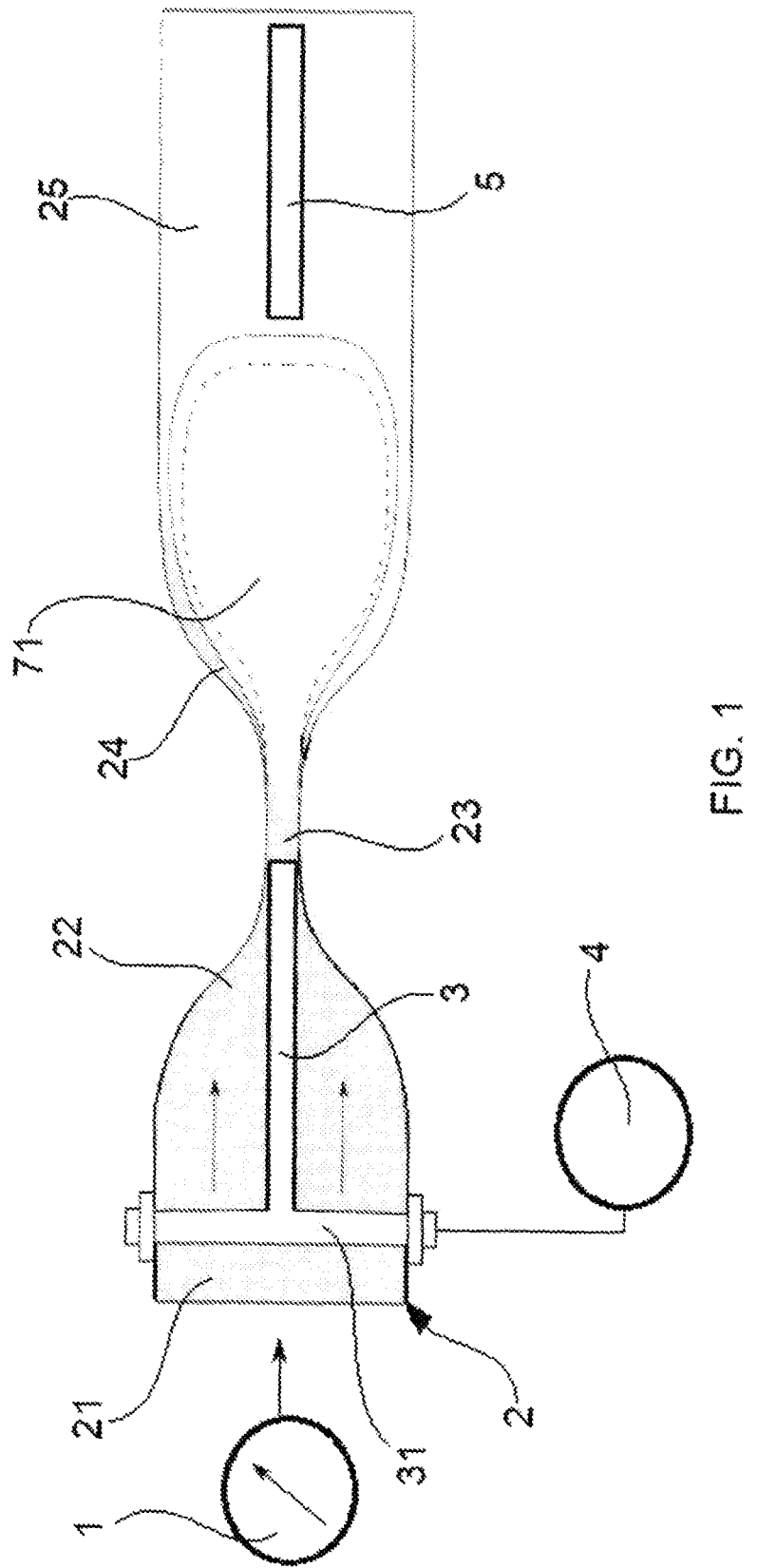
FIG. 1 is a schematic drawing of the device in cavitation mode.

The device for pursuit of the method of treatment of liquids consists, in basic design which is illustrated in FIG. 1, of mutually in series connected a pressure regulator 1 and a cavitation tube 2 which is formed by in series on each other connected a cylindrical inlet chamber 21, confusor 22, cylindrical working chamber 21, diffusor 24 and a cylindrical discharge chamber 25. In the inlet chamber 21 is perpendicularly to the lengthwise axis of the cavitation tube 2 placed an electrode support to which is fixed an oblong powered electrode 3 placed on the lengthwise axis of the inlet chamber 21 and reaches with its free end into the working, chamber 23, whereas the powered electrode 3 is electrically conductive connected with the electrode support 31 yet both elements 3 and 31 are from the body of the cavitation tube 2 electrically insulated. To the electrode support 31 is connected a high voltage source 4 by which is via the electrode support 31 powered the powered electrode 1. In the discharge chamber 25 is placed the grounding electrode 5 by the help of which is grounded also the liquid flowing in the cavitation tube 2. The circular shape of cross section of the cavitation tube 2 is not only possible design, as the cross section of the cavitation tube 2 can have arbitrary shape.

Figure 3:
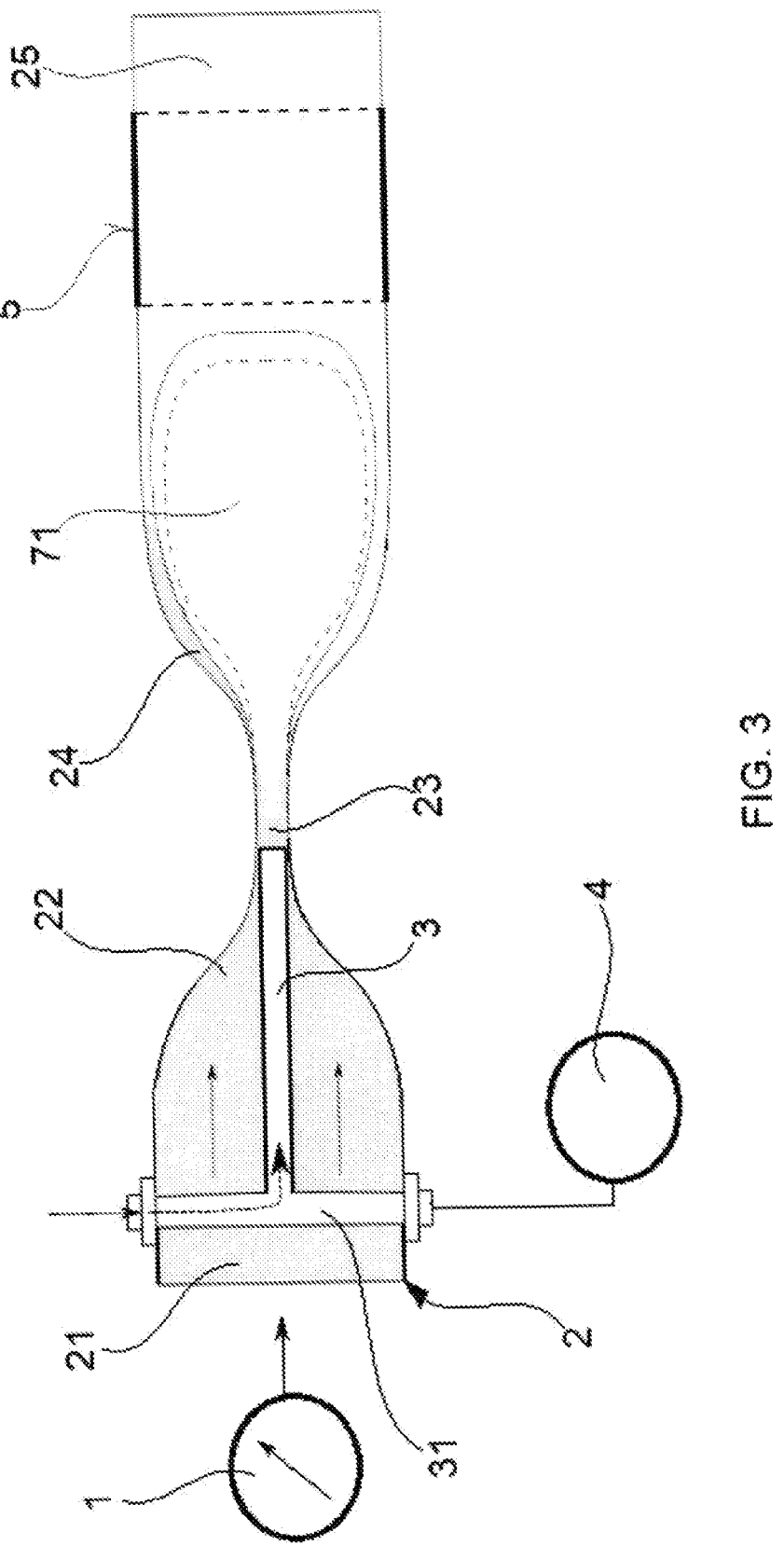
FIG. 3 is a schematic drawing of the device with alternative design of grounding electrode.
Figure 4:
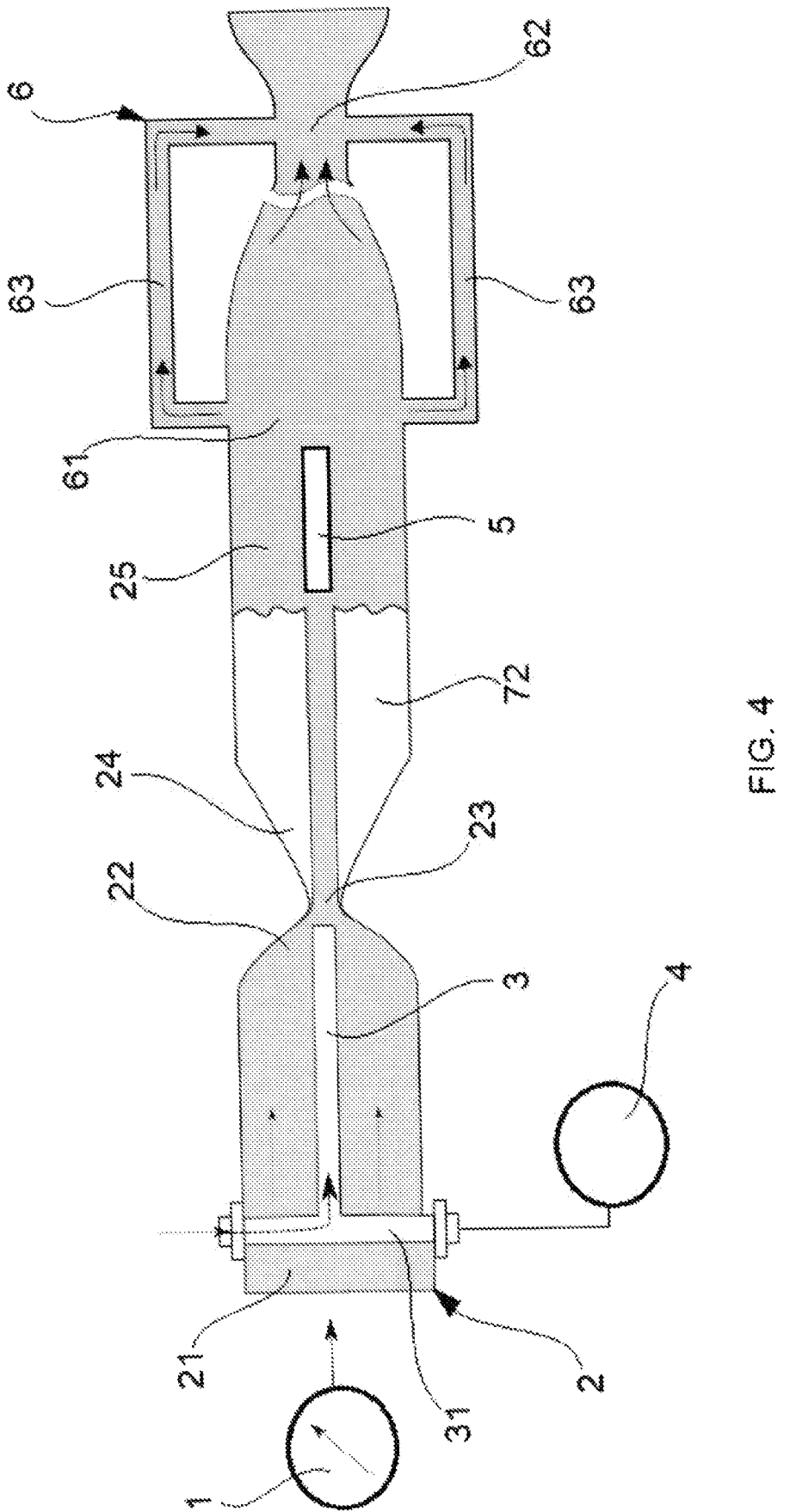
FIG. 4 is a schematic drawing of the device with added ejector and FIG. 5 is a schematic drawing of the device with an ultrasound generator connected to the grounding electrode.
Figure 5:
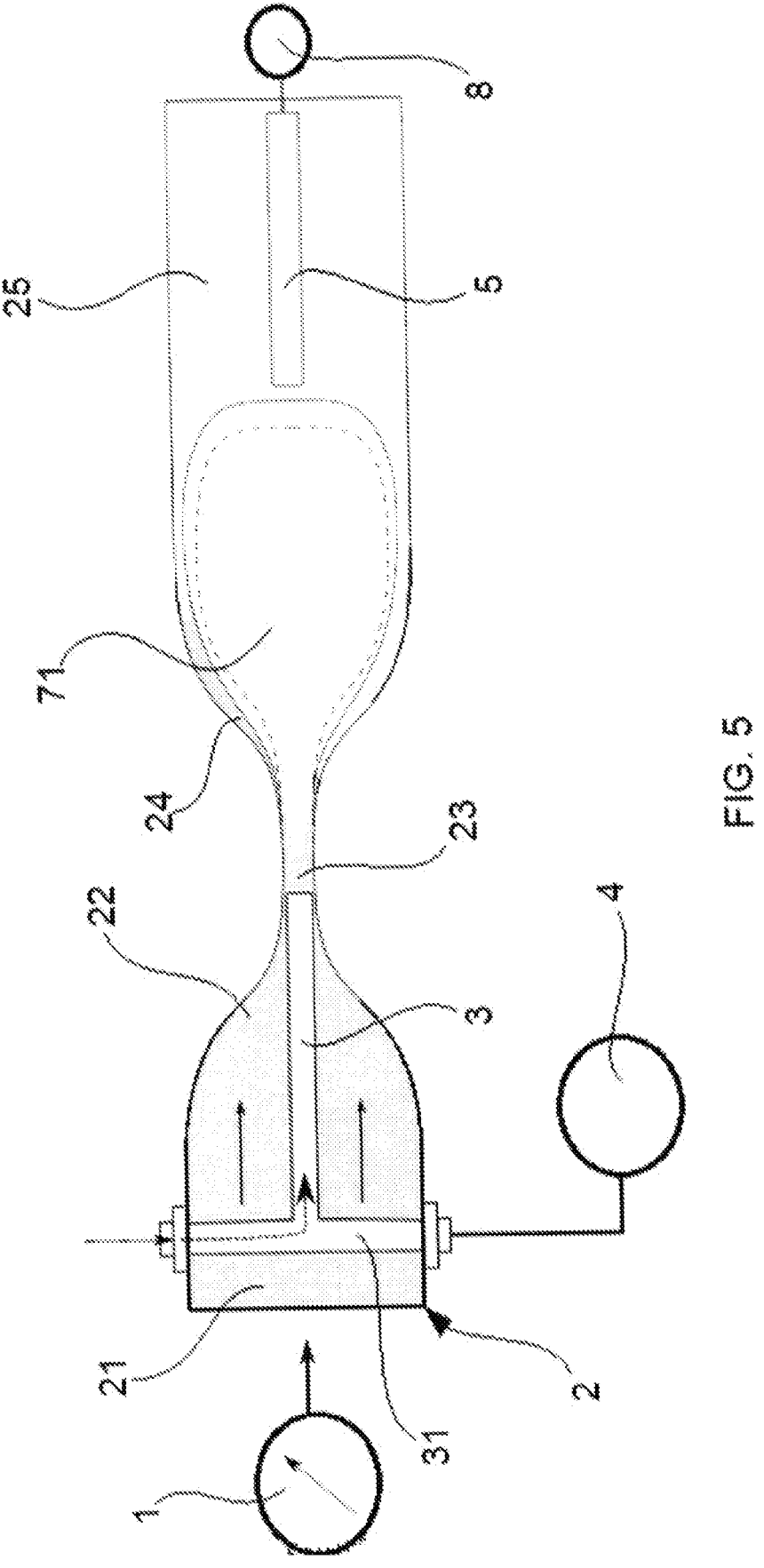

Alternatively are the electrode support 31 and the powered electrode a made hollow with formed common non-illustrated transit cavity which is open on one side out from the cavitation tube 2 and on the other side on free end of the powered electrode 3 reaches into the working chamber 23 as it is illustrated in FIGS. 3 to 5.

Another alternative is design of the grounding electrode as a part of the shell of the cylindrical discharge chamber 25 as it is illustrated in FIG. 3.

Another alternative which is illustrated in FIG. 4 is placement of an ejector 6 behind the discharge chamber 25. The ejector 6 is formed by a supply chamber 61 which is connected to the discharge chamber 25 and a throat 62. From the supply chamber 61 is sideways taken out a suction pipeline 63 which opens into the throat 62. The ejector 6 can be alternatively substituted by a non-illustrated pump.

Alternatively is the grounding electrode 5 designed as an oscillating ultrasound powered tip which is connected to an ultrasound generator 8 as it is illustrated in FIG. 5.

Figure 2:
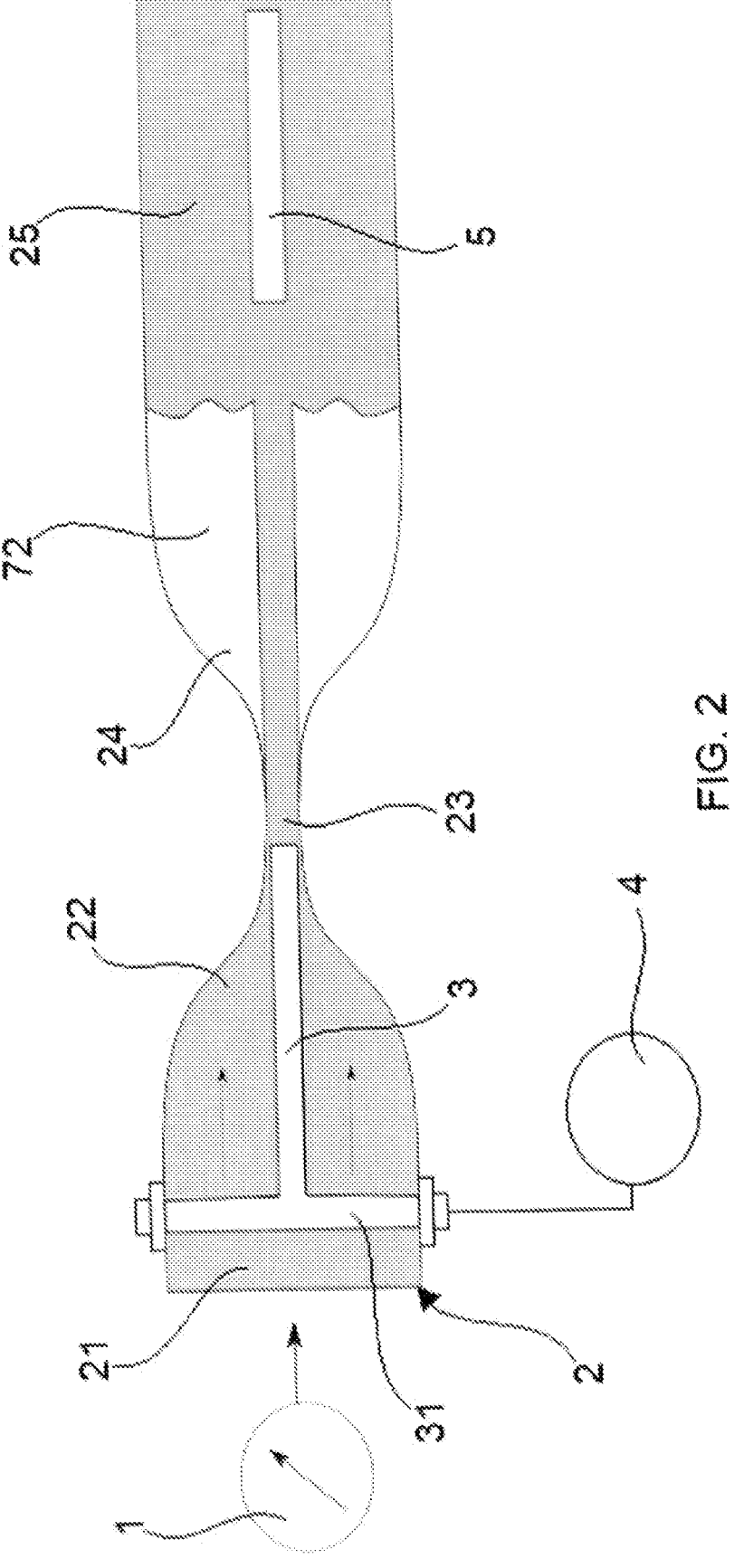
FIG. 2 is a schematic drawing of the device in super-cavitation mode.

During pursuit of the method of treatment of the liquids according to the FIG. 1 is by the pressure regulator 1 kept such pressure value of the liquid which flows through the inlet chamber 21 into the cavitation tube 2 to enable at the place of contraction, generation of cavitation or super-cavitation. The liquid is from the inlet chamber 21 taken to the confusor 22 where comes to significant increase of its speed and at the same time to decrease of the pressure, namely under pressure of saturated vapors. In this moment in the confusor 22 start to appear first bubbles which at high speed advance through the working chamber 23 where starts to generate cavitation. In the diffusor 24 comes, thanks to separation of a boundary layer, to next decrease of the pressure and significant extension of the cavitation zone which fills practically the whole space of the diffusor 24 and advances even into the discharge chamber 25 where comes to generation of cavitation cloud 71. Possibly comes to generation of super-cavitation 22 when the liquid flows only through the central part of the discharge chamber 25 and around it is the space completely filled with super-cavitation medium as it is illustrated in FIG. 2. By the high voltage source 4 whose frequency ranges between 0 to 20 MHz is powered the powered electrode 3 through whose potential toward the grounding electrode 5 is generated electromagnetic field whose direction is parallel with the direction of liquid flow. Through this electromagnetic field are then powered the discharges of the plasma which burns in the whole area of the cavitation 71 or super-cavitation 72.

In an alternative design when the electrode support 31 and the electrode 3 are made hollow, can be through the cavity, which is formed inside of them, supplied into the space of generation of the cavitation 71 or super-cavitation 72 gas or solid particles.

INDUSTRIAL USABILITY

The invention is usable for generation of low-temperature plasma in liquids which serves for plasma treatment of liquids or suspensions of liquids which contain biological and chemical contaminants or liquids which contain dispersed powders but also for treatment of non-conductive materials in the form of rods and threads in liquids without access of air in hygiene industry, chemical industry, building industry, industry, food industry and so on. The invention is usable for decontamination of water not only waste water but also for sterilization of potable and service water and furthermore for treatment of liquids based on hydrocarbons as are for example oils, paints and so on.

The invention claimed is:

1. A device for treatment of liquids comprising:

a pressure regulator; and a cavitation tube that is coupled to the pressure regulator, wherein the cavitation tube comprises:

an inlet chamber; and a converging section that is coupled to the inlet chamber;

a working chamber that is coupled to the converging section;

a diverging section that is coupled to the working chamber; and a discharge chamber that is coupled to the diverging section, wherein the inlet chamber comprises along a lengthwise axis of the inlet chamber, in a direction of liquid flow, a powered electrode having an end that extends into the working chamber, wherein the powered electrode is electrically connected to a high voltage source that is configured to generate plasma in a liquid disposed in the device during operation, wherein the powered electrode is electrically insulated from a body of the cavitation tube, and wherein the discharge chamber comprises a grounding electrode that is configured to be in electrical contact with the liquid when the liquid is in the discharge chamber.

2. The device according to the claim 1, wherein the powered electrode is coupled to an electrode support that is placed inside the inlet chamber, wherein a portion of the electrode support runs perpendicularly to the lengthwise axis of the inlet chamber, wherein the electrode support is electrically insulated from the cavitation tube, wherein the powered electrode and the electrode support are electrically connected to each other, and wherein the electrode support is connected to the high voltage source.

3. The device according to the claim 2, wherein the electrode support and the powered electrode each comprise a hollow portion, wherein the hollow portion of the electrode support and the hollow portion of the powered electrode comprise a common transit cavity that is open at a first end external to the cavitation tube and open at the end of the powered electrode that extends into the working chamber.

4. The device according to claim 1, wherein the grounding electrode comprises a part of a shell of the discharge chamber.

5. The device according to claim 1, wherein the grounding electrode comprises an oscillating ultrasound powered tip that is connected to an ultrasound generator.

6. The device according to claim 1, wherein an ejector is disposed downstream of the discharge chamber, wherein the ejector comprises:

a supply chamber that is connected to the discharge chamber; and a throat, wherein a suction pipeline fluidly connects the throat to the supply chamber, and wherein the ejector is configured to induce suction flow through the suction pipeline during operation of the device.

7. The device according to claim 1, further comprising a pump that is disposed downstream of the discharge chamber.

8. The device according to claim 3, wherein the grounding electrode comprises a part of a shell of the discharge chamber.

9. The device according to claim 3, wherein the grounding electrode comprises an oscillating ultrasound powered tip that is connected to an ultrasound generator.

10. The device according to claim 5, further comprising an ejector that is disposed downstream of the discharge chamber, wherein the ejector comprises:

a supply chamber that is connected to the discharge chamber;

a throat; and

8 a suction pipeline that extends from the supply chamber to the throat.

11. The device according to claim 6, further comprising a pump that is disposed downstream of the discharge chamber.

12. A method of treatment of a liquid using the device according to claim 1, the method comprising:

flowing the liquid through the cavitation tube; and generating a low-temperature plasma in a region of cavitation or super-cavitation in a flow path of the liquid by applying a high voltage electrical discharge to the powered electrode, wherein the powered electrode is positioned along the direction of flow, and wherein the high voltage electrical discharge is applied at a frequency in a range of 0 to 20 MHz.

13. The method according to the claim 12, wherein generating the low-temperature plasma further comprises ultrasonically stimulating the low-temperature plasma.

14. The method according to claim 12, further comprising supplying a gas into the region of cavitation or super-cavitation.

15. The method according to claim 12, further comprising supplying a solid substance in powdered form into the region of cavitation or super-cavitation.

16. The method according to the claim 15, wherein the solid substance comprises a reactive material.

17. The method according to claim 12, further comprising withdrawing the liquid from a region downstream of a location at which cavitation collapses in the device.

18. The method according to claim 13, further comprising supplying a gas into the region of cavitation or super-cavitation.

19. The method according to claim 13, further comprising supplying a solid substance in powdered form into the region of cavitation super-cavitation.

20. A method of treatment of a liquid using the device according to claim 7, the method comprising:

flowing the liquid through the cavitation tube; and generating a temperature plasma in a region of cavitation or super-cavitation in a flow path of the liquid by applying a high voltage electrical discharge to the powered electrode, wherein the powered electrode is positioned along the direction of flow, and wherein the electrical discharge is applied at a frequency in a range of 0 to 20 MHz.

* * * * *